United States Patent
Jain et al.

(10) Patent No.: US 10,664,585 B2
(45) Date of Patent: May 26, 2020

(54) AUTHENTICATION USING MULTIPLE MOBILE DEVICES

(71) Applicant: CA, Inc., New York, NY (US)

(72) Inventors: Piyush Jain, Hyderabad (IN); Deepak Verma, Hyderabad (IN)

(73) Assignee: CA, Inc., New York, NY (US)

( * ) Notice: Subject to any disclaimer, the term of this patent is extended or adjusted under 35 U.S.C. 154(b) by 235 days.

(21) Appl. No.: 15/943,413

(22) Filed: Apr. 2, 2018

(65) Prior Publication Data
US 2019/0303556 A1 Oct. 3, 2019

(51) Int. Cl.
| | |
|---|---|
| *G06F 21/00* | (2013.01) |
| *G06F 21/42* | (2013.01) |
| *G06F 21/62* | (2013.01) |
| *G06F 21/44* | (2013.01) |

(52) U.S. Cl.
CPC ............ *G06F 21/42* (2013.01); *G06F 21/445* (2013.01); *G06F 21/6209* (2013.01)

(58) Field of Classification Search
CPC .... G06F 21/42; G06F 21/445; G06F 21/6209; G06F 21/31; H04L 63/0838; H04L 2463/082; H04L 63/0853; H04L 9/3228; H04W 12/0608
See application file for complete search history.

(56) References Cited

U.S. PATENT DOCUMENTS

| | | | |
|---|---|---|---|
| 9,292,668 B1 * | 3/2016 | Spangler | G06F 21/31 |
| 2009/0064294 A1 * | 3/2009 | Cook | G06F 21/34 |
| | | | 726/6 |
| 2011/0162053 A1 * | 6/2011 | Pei | G06F 21/34 |
| | | | 726/6 |

OTHER PUBLICATIONS

Glenn Fleishman, Wearable security: Authentication apps for Apple Watch, Macworld, Jun. 1, 2015, https://www.macworld.com/article/2929014/wearable-security-two-factor-authentication-apps-for-apple-watch.html, 7 pages.

* cited by examiner

*Primary Examiner* — Yogesh Paliwal
(74) *Attorney, Agent, or Firm* — Kowert, Hood, Munyon, Rankin & Goetzel, P.C.

(57) ABSTRACT

Techniques are disclosed relating to a computer system including a first mobile device that stores information that is inaccessible without a value stored on a second mobile device. In some embodiments, the first mobile device stores a plurality of one-time password generation routines executable to generate one-time passwords usable to authenticate user access to an electronic resource, and the second mobile device stores a plurality of supplemental authentication values that correspond to the one-time password generation routines. A particular one-time password generated by the first mobile device using a particular one-time password generation routine is inaccessible without the corresponding particular supplemental authentication value stored on the second mobile device. In embodiments, the particular supplemental authentication value is sent to the first mobile device and the corresponding particular one-time password generated by the first mobile device using the corresponding particular one-time password generation routine becomes accessible.

20 Claims, 6 Drawing Sheets

AUTHENTICATION USING MULTIPLE MOBILE DEVICES

BACKGROUND

Technical Field

This disclosure relates generally to the authentication of user communication with a computer system.

Description of the Related Art

When a user interacts with a computer system to access an electronic resource, it may be useful to confirm the user's identity to ensure that the user should be granted access to the electronic resource to prevent unauthorized access to, for example, email mailboxes, bank accounts, social network accounts, etc. A user's identity may be authenticated using various factors including knowledge (i.e., something the user knows such as a password), possession (i.e., something the user has physical access to such as a bank card), and inherence (i.e., something that is part of or physically indicative of the user such as biometric indicators). Some computer systems utilize two-step authentication methods that are based on a user inputting one or more of these factors as a first step and using a one-time password that is either sent to the user by the computer system (e.g., a password sent to the user's email inbox) or a one-time password generated by a device to which the user has access (e.g., a code generated with user's cell phone).

SUMMARY

Techniques are disclosed herein to restrict access to information stored on a first mobile device, with the information being accessible with a value stored on a second mobile device (but not the first mobile device) that is sent to the first mobile device. In various embodiments, a first mobile device stores a plurality of one-time password generation routines and a second mobile device stores a plurality of supplemental authentication values that correspond to the various one-time password generation routines. The first mobile device is configured to output a one-time password using both a particular one-time password generation routine and its corresponding particular supplemental authentication value stored on the second mobile device. The resulting one-time password is usable to authenticate user communication with an authentication system. In such embodiments, the second mobile device sends the particular supplemental authentication value to the first mobile device. The first mobile device uses the particular supplemental authentication value and the corresponding particular one-time password generation routine to output a one-time password generated using the particular one-time password generation routine, and the first mobile device does not retain the particular supplemental authentication value thereafter. In various embodiments, the one-time password is sent to the authentication system directly by the first mobile device, sent to the second mobile device which in turns sends the one-time password to the authentication system, or is made available to the user so the user can input the one-time password to the authentication system.

Figure 1:
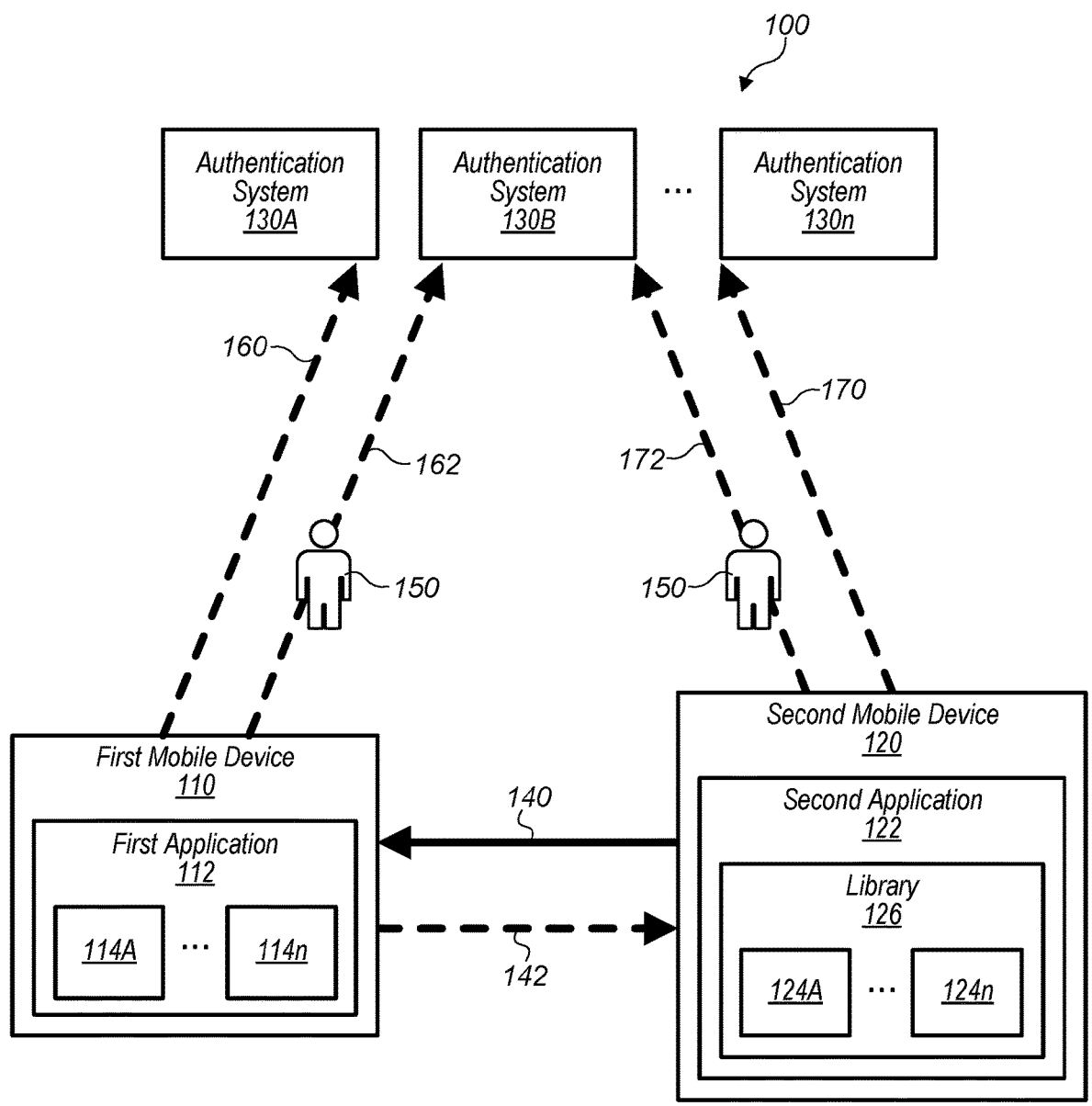
FIG. 1 is a block diagram illustrating an embodiment of a computer system configured to authenticate user communication.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to receive a value" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" mobile devices would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the word "module" refers to structure that stores or executes a set of operations. A module refers to hardware that implements the set of operations, or a memory storing the set of instructions such that, when executed by one or more processors of a computer system, cause the computer system to perform the set of operations. A module may thus include an application-specific integrated circuit implementing the instructions, a memory storing the instructions and one or more processors executing said instructions, or a combination of both.

DETAILED DESCRIPTION

Figure 2:
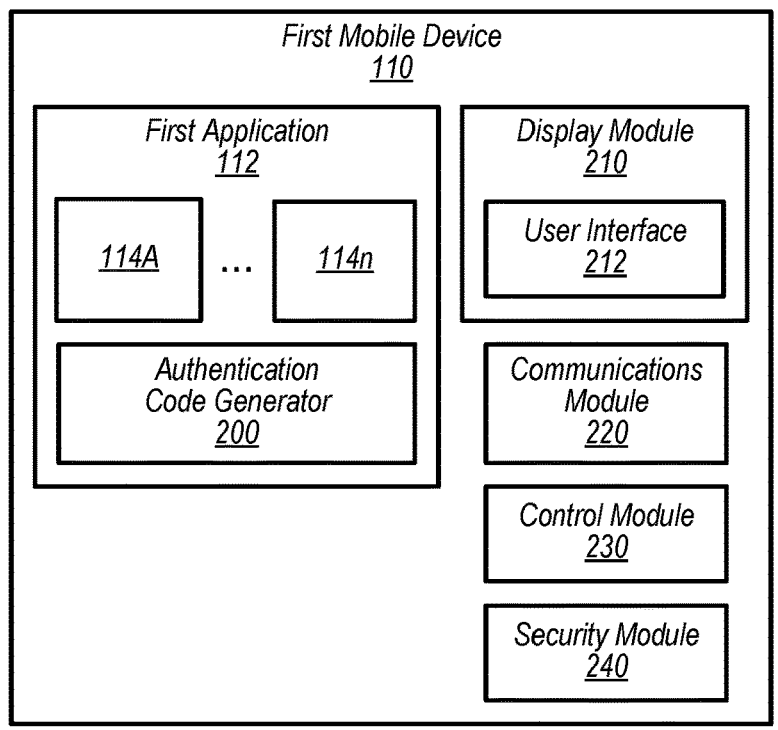
FIG. 2 is an expanded block diagram of the first mobile device of FIG. 1 in accordance with various embodiments.
Figure 3:
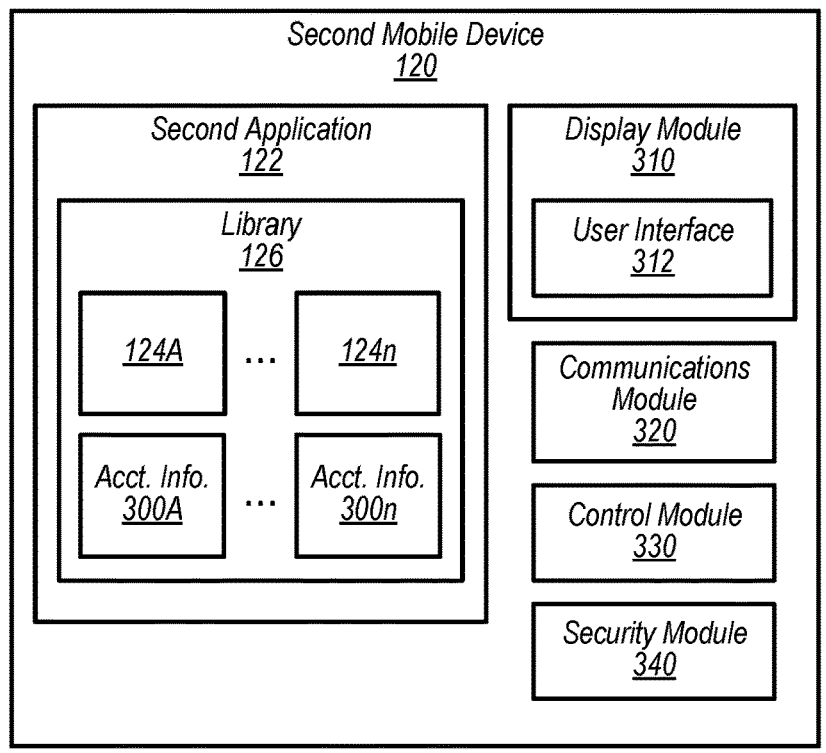
FIG. 3 is an expanded block diagram of the second mobile device of FIG. 1 in accordance with various embodiments.

This disclosure describes techniques for authenticating user communication using multiple mobile devices. Embodiments for a computer system including one or more authentication systems, a first mobile device, and a second mobile device wherein the first and second mobile device are used to authenticate user communication with the one or more authentication systems is described in reference to FIG. 1. Further details relating to the first mobile device and second mobile device are discussed with reference to FIG. 2 and FIG. 3, respectively. Mobile device authentication methods are described with reference to FIGS. 4 and 5, and a two-mobile device authentication setup method is described with reference to FIG. 6. Finally, an exemplary computer system, which may implement the various components of FIGS. 1, 2, and 3, is discussed with reference to FIG. 7.

Referring now to FIG. 1, a block diagram of an exemplary embodiment of a computer system 100 is depicted. In various embodiments, computer system 100 includes a first mobile device 110, a second mobile device 120, and one or more authentication systems 130. As used herein, the phrase "first mobile device" is used to refer to a device that receives one or more supplemental authentication values (e.g., PINs) that are stored on a "second mobile device," but not the first mobile device. The terms "first" and "second" do not imply any type of ordering, but rather are used to denote different roles in the paradigms disclosed herein.

In the embodiment depicted in FIG. 1, first mobile device 110 stores one or more first applications 112. First application 112 is executable to communicate with second application 122 running on second mobile device 120 and to perform a plurality of one-time password generation routines 114. In various embodiments, first application 112 may store any of a number of one-time password generation routines 114 (e.g., first routine 114A, nth routine 114n). As discussed herein, in various embodiments, first mobile device 110 uses a particular one-time password generation routine 114 and a corresponding particular supplemental authentication value 124 received from second mobile device 120 to output a particular one-time password. The first mobile device 110 outputs the particular one-time password without retaining the particular supplemental authentication value 124 for future one-time password output using the particular one-time password generation routine 114. The various components of first mobile device 110 are discussed in further detail with reference to FIG. 2.

In the embodiment depicted in FIG. 1, second mobile device 120 stores one or more second applications 122. Second application 122 is executable to store a plurality of supplemental authentication values 124 in a supplemental authentication value library 126. Each of the plurality of supplemental authentication values 124 is associated with one of the plurality of one-time generation password generations routines 114 stored on first mobile device 110. As discussed herein, the plurality of supplemental authentication values 124 (e.g., a first supplemental authentication value 124A, an nth supplemental authentication value 124n) are stored on second mobile device 120 and not first mobile device 110. Second application 122 is executable to receive (e.g., via a user interface, via communication with an authentication server 130) an indication of a particular one of the plurality of one-time password generation routines 114. Second application 122 is executable to select from supplemental authentication value library 126, the particular supplemental authentication value 124 associated with the particular one-time password generation routine 114. Second application 122 is further executable to communicate with first mobile device 110 and to send an indication 140 of the particular supplemental authentication value 124 such that a corresponding one-time password (generated using the particular one-time password generation routine 114) can be output. The various components of second mobile device 120 are discussed in further detail with reference to FIG. 3.

Authentication system 130 is a computer system that is configured to communicate with users (e.g., user 150) and authenticate the user's identity as part of determining whether to grant access to one or more restricted electronic resources. There may be any of a number of authentication systems (e.g., a first authentication system 130A, a second authentication system 130B, a nth authentication system 130n) in computer system 100. Authentication system 130 may be a portion of a system that providers user access to the restricted electronic resources (e.g., by serving a secured website, granting access to a secured network, by granting access to a restricted file) or authentication system 130 may be a dedicated system that is coupled to such a system (e.g., a server serving a bank website is coupled to authentication system 130 which authenticates login attempts to the bank's website). In various embodiments, authentication system 130 authenticates the identity of user 150 using two-step authentication. In various embodiments, authentication system 130 confirms a user's claimed identity with two-step authentication method by utilizing information (e.g., a username, a password, a username and a password) known to the user 150 (and ideally not known by other individuals) and by receiving a one-time password generated according to the techniques discussed herein with connection to FIG. 2-5.

In various embodiments, prior to attempting to authenticate communication with a particular user 150 using a two-step authentication process as discussed herein, authentication system 130 generates information for the particular user 150 that is useable to generate predicable one-time passwords. For example, the information generated by authentication system 130 may be a secret code used in conjunction with a time-based value to generate a series of predictable one-time passwords over time, and this secret code and the series of predictable one-time passwords are associated with the particular user 150 (e.g., associated with a particular account of user 150). In some of such embodiments, authentication system 130 retains a first copy of the secret code and sends a second copy of the secret code to a device associated with the particular user 150 (e.g., a first mobile device 110). This kind of arrangement is known in the art as using a "shared secret." The time-based value may be a simple counter (e.g., the number of seconds that have elapsed since the authentication system 130 sent the secret code to the first mobile device 110) that is used to derive the one-time password. This technique is used in Hash-based Message Authentication Code (HMAC)-based One-Time Password (HOTP) algorithm. In other embodiments, the time-based value may be based on a timestamp. This technique is used in the Time-based One-Time Password (TOTP) algorithm. The series of one-time passwords, then, may be generated according to any cryptographic technique using a shared secret and a time-based value.

For example, if the shared secret is the word "PASSWORD," the time-based value is an eight-digit counter that is incremented every minute, and the cryptographic techniques used to generate the password is simply appending the time-based value to the shared secret word, then one minute after the shared secret is exchanged the one-time password would be 00000001PASSWORD and two days after the shared secret is exchanged the one-time password would be 00002880PASSWORD and so on. If both the authentication system 130 and the first mobile device 110 have this information, both devices are able to independently generate the one-time password without additional communication subsequent to the exchange of the shared secret. It will be understood that this cryptographic technique is simplified and in various embodiments the one-time password may be a long, complex string of characters that is effectively impossible to predict without access to the shared secret and/or the algorithm used to generate the one-time password.

Thus, authentication system 130 is able to authenticate the purported identity of a user 150 by first receiving an indication of the identity of the user 150 (e.g., by receiving a correct username and password combination) and second by receiving the one-time password that is predicated to be generated by a first mobile device 110 known to be associated with the user 150. For example, as discussed herein, if first mobile device 110 is a particular user's smartphone, after user 150 inputs their username and password into a social media website that uses an authentication system 130 to verify login attempts, the social media website asks for a one-time password generated by the first mobile device 110. The first mobile device 110 generates the one-time password. The one-time password is sent to the social media website, which in turn compares the received one-time password to the one-time password that was predicated to be received. If the received one-time password matches the predicted one-time password, the identity of user 150 is authenticated and the user 150 is granted access.

Indication 140 is one or more messages sent by second mobile device 120 to first mobile device 110 that includes an indication of a particular supplemental authentication value 124. Indication 140 may include some or all of the supplemental authentication value 124 itself or one or more values generated using the supplemental authentication value 124 (e.g., an encrypted version of supplemental authentication value 124). Indication 140 may be sent via a wired connection (e.g., a USB connection) and/or via a wireless connection (e.g., Bluetooth, Wi-Fi, etc.). In embodiments where first mobile device 110 and second mobile device 120 are paired together, indication 140 may be sent using a secured communication channel (e.g., secured using cryptography).

In various embodiments, first mobile device 110 sends one or more messages 142 to second mobile device 120. In some of such embodiments, first mobile device 110 sends one or more messages 142 to second mobile device 120 prior to generating the one-time password (e.g., to request the particular supplemental authentication value 124 corresponding to a particular one of the plurality of one-time password generation routines 114). In various embodiments, message 142 includes an indication of a one-time password generated by first mobile device 110 as discussed herein. In such embodiments, having received the one or more messages 142, second mobile device 120 may be used as part of authentication pathways 170 or 172 as discussed herein. The one or more message 142 may include some or all of the generated one-time password itself or one or more values generated using the one-time password (e.g., an encrypted version of the one-time password). Message 142 may be sent via a wired connection (e.g., a USB connection) and/or via a wireless connection (e.g., Bluetooth, Wi-Fi, etc.). In embodiments where first mobile device 110 and second mobile device 120 are paired together, message 142 may be sent using a secured communication channel (e.g., secured using cryptography).

User 150 is an individual who is attempting to access an electronic resource (e.g., a website, a network, a file, etc.) that is restricted. Whether user 150 should be granted access to the electronic resource is determined (at least in part) by an authentication system 130. In various embodiments, user 150 has access to both first mobile device 110 and second mobile device 120 and uses both to authenticate their identity as discussed herein. User 150 may be a natural person, a group of natural persons, an organization in various embodiments.

Authentication pathways 160, 162, 170, and 172 are one or more data flow pathways via which a generated one-time password may be sent to an authentication system 130. In authentication pathway 160, a one-time password is sent from first mobile device 110 to authentication system 130 directly. In authentication pathway 160, first mobile device 110 sends one or more messages (via a wired and/or wireless communications medium) to authentication server 130 containing some or all of the one-time password or one or more values generated using the one-time password (e.g., an encrypted version of the one-time password). For example, in some embodiments, authentication pathway 160 includes first mobile device 110 sending an electronic message containing an encrypted version of the one-time password to authentication system 130 via a wireless network connection, via a wired connection, via a near-field communication (NCF) reader coupled to authentication system 130, etc. In other embodiments, authentication pathway 160 includes first mobile device 110 playing one or more sounds corresponding to the one-time password (e.g., the one-time password modulated onto a sonic carrier wave, sound of the one-time password expressed in Morse code) that is received via a microphone coupled to authentication system 130. In various embodiments, first mobile device 110 communicates with authentication system 130 or a LAN and/or the Internet in authentication pathway 160.

Authentication pathway 170 is similar to authentication pathway 160, except that the second mobile device 120 is used to relay the one-time password generated by first mobile device 110 (and sent to second mobile device 120 via one or more messages 142) to authentication system 130 via a wired and/or wireless communications medium). For example, in some embodiments, authentication pathway 170 includes second mobile device 120 sending an electronic message containing an encrypted version of the one-time password to authentication system 130 via a wireless network connection, via a wired connection, via a NCF reader coupled to authentication system 130, etc. In other embodiments, authentication pathway 170 includes second mobile device 120 playing one or more sounds corresponding to the one-time password (e.g., the one-time password modulated onto a sonic carrier wave, sound of the one-time password expressed in Morse code) that is received via a microphone coupled to authentication system 130. In various embodiments, second mobile device 120 communicates with authentication system 130 or a LAN and/or the Internet in authentication pathway 170.

In authentication pathway 162, user 150 access the one-time password using first mobile device 110 and sends the one-time password to authentication system 130 in one or more messages. In some of such embodiments, authentication pathway 162 includes first mobile device 110 making the one-time password (or information generated using the one-time password) available to user 150 and user 150 inputting the one-time password (or information generated using the one-time password) to authentication system 130. For example, in various embodiments first mobile device 110 displays visual information corresponding to the one-time password (e.g., the one-time password represented in alphanumeric characters, the one-time password encoded in a one- or two-dimensional barcode) that the user 150 inputs to authentication system 130 (e.g., by typing in a displayed one-time password, by holding the display of the first mobile device 110 to a visual sensor such that the one-time password encoded in a barcode can be read by the visual sensor). In other embodiments, first mobile device 110 relays one-time password to user 150 in other ways such as by sounds (e.g., by a computer-generated voice reading the one-time password) and/or by touch (e.g., via a refreshable braille display, via vibrations corresponding to the one-time password expressed in Morse code), and user 150 in turn inputs the one-time password to authentication system 130. In various embodiments, the one-time password entered by user 150 is sent to authentication system 130 via the Internet in authentication pathway 162.

Authentication pathway 172 is similar to authentication pathway 162, except that user 150 uses second mobile device 120 to input the one-time password generated by first mobile device 110 (and sent to second mobile device 120 via one or more messages 142) to authentication system 130. For example, in various embodiments second mobile device 120 displays visual information corresponding to the one-time password (e.g., the one-time password represented in alphanumeric characters, the one-time password encoded in a one- or two-dimensional barcode) that the user 150 inputs to authentication system 130 (e.g., by typing in a displayed one-time password, by holding the display of the second mobile device 120 to a visual sensor such that the one-time password encoded in a barcode can be read by the visual sensor). In other embodiments, second mobile device 120 relays one-time password to user 150 in other ways such as by sounds (e.g., by a computer-generated voice reading the one-time password) and/or by touch (e.g., via a refreshable braille display, via vibrations corresponding to the one-time password expressed in Morse code), and user 150 in turn inputs the one-time password to authentication system 130. In various embodiments, the one-time password entered by user 150 is sent to authentication system 130 via the Internet in authentication pathway 172.

Using first mobile device 110 and second mobile device 120, user 150 is able to authenticate their identity to authentication system 130, thereby allowing authentication system 130 to better protect the various electronic resources the authentication system 130 is configured to protect. The use of two (or more) separate mobile devices increases the security of system 100 because access to only one of the two mobile devices is insufficient to authenticate user access. For example, if the first mobile device 110 were to fall into the hands of an unauthorized user (e.g., by theft from user 150), the unauthorized user might have access to the first mobile device 110, first application 112, and one or more one-time password generation routines 114, but these are not sufficient to provide the unauthorized user access to the one-time passwords because the unauthorized user does not have access to the supplemental authentication values 124 or other components of second mobile device 120. Similarly, if the second mobile device 120 were to fall into the hands of an unauthorized user, the unauthorized user might have access to the second mobile device 120, second application 122, and one or more supplemental authentication values 124, but these are not sufficient to provide the unauthorized user access to the one-time passwords because the unauthorized user does not have access to the one-time password generation routines 114 or other components of first mobile device 110.

Further, even in embodiments where a user 150 can manually input one or more of the supplemental authentication values 124 (e.g., because the values 124 are 4-digit PINs) into first application 112 (e.g., via a user interface), being able to store the supplemental authentication values 124 on second mobile device 120 means user 150 does not have to memorize a collection of different PINs that are correspond to different one-time password generation routines 114 and/or the user 150 does not have to write down various PINs (which would make computer system 100 less secure). Accordingly, the disclosed techniques allow users 150 to securely access electronic resources without having to memorize a collection of additional PINs/passwords while adding security to computer system 100 by storing authentication information on separate devices.

In various other embodiments, techniques discussed herein can be applied in circumstances other than one-time password generation. For example, instead of first mobile device 110 storing a plurality of one-time password generation routines, first mobile device 110 may store any type of secured information (e.g., secured applications, secured documents). In such an embodiment, such secured information corresponds to values (e.g., passwords, PINs, keys) stored on second mobile device 120. In various embodiments, the secured information cannot be accessed by a user 150 via first mobile device 110 without the corresponding value stored on second mobile device 120. Upon first mobile device 110 receiving the corresponding value from second mobile device 120, user 150 is able to access the secured information (e.g., to run a secured application, to view a secured document, etc.).

Referring now to FIG. 2, an expanded block diagram of the first mobile device 110 of FIG. 1 is depicted in accordance with various embodiments. First mobile device 110 includes first application 112, a display module 210, a communications module 220, a control module 230, and a security module 240. First mobile device 110 may be any of a number of computing devices including but not limited to a desktop computer, laptop computer, tablet computer, smartphone, wearable mobile device (e.g., smartwatch, glasses). In various embodiments, first mobile device 110 is a smartphone. Various embodiments of first mobile device 110 may exclude certain components such as security module 240 or have additional components (e.g., multiple communications modules 220).

First application 112 is an application running on first mobile device 110. First application 112 is executable to cause first mobile device 110 to perform various tasks associated with FIGS. 4 and 6 discussed herein, as well as other tasks. In various embodiments, first application 112 includes any of a number of one-time password generation routines 114 (e.g., first routine 114A, nth routine 114n) and an authentication code generator 200. In various embodiments, first application 112 is an application that has been downloaded from a server coupled to a digital distribution platform (e.g., the Apple® App Store, Google® Play, Microsoft® Store) that stores installation files for first application 112. First application 112 is executable to communicate with second application 122 as discussed herein. While only a single first application 112 is shown in FIGS. 1 and 2, in other embodiments first mobile device 110 includes a set of one or more first applications 112, each of which including one or more one-time password generation routines 114. For example, in various embodiments, one first application 112 includes a plurality of one-time password generation routines 114 associated with authentication systems 130 coupled protecting electronic resources relating to financial websites (e.g., the website of a bank) and another first application 112 includes a plurality of one-time password generation routines 114 associated with authentication systems 130 coupled protecting electronic resources relating to social network websites (e.g., Facebook®).

One-time password generation routines 114 are a plurality of routines that are executable to generate one-time passwords as discussed herein. The various routines 114 are associated with the various authentication systems 130, and are executable to generate one-time passwords to be sent to their corresponding authentication systems 130. In various embodiments, the routines 114 are associated with a username and/or password usable to login to an electronic resource (e.g., a username and password used to log into a bank account). In some embodiments, each routine 114 is associated with a different authentication system 130 (e.g., routine 114A is associated with authentication system 130A, routine 114B (not shown) is associated with authentication system 130B (not shown)). In other embodiments, various sets of routines 114 are associated with a particular authentication system. For example, a set of routines 114 may each be associated with a different username, with each of the different usernames usable to login to an electronic resource where login attempts are authenticated using the same authentication system 130. The routines 114 may generate one-time passwords according to any of a number of cryptographic techniques. For example, in various embodiments the routines 114 may use HTOP and/or TOTP discussed herein. In various embodiments, the routines 114 use shared secret cryptography to generate a series of one-time passwords and are each associated with a supplemental authentication value 124 in the supplemental authentication value library 126 on second mobile device 120.

Authentication code generator 200 runs the various routines 114. In some embodiments, first application 112 includes a single authentication code generator 200 that executes the routines 114. In other embodiments, each routine 114 may have a dedicated authentication code generator 200 or sets of routines 114 may share an authentication code generator 200. In various embodiments, authentication code generator 200 computes a restricted version of a particular one-time password using a particular one-time password generation routine 114. In such embodiments, the restricted version of the particular one-time password is inaccessible to user 150 of the first mobile device 110, and first application 112 prepares an unrestricted version of the one-time password using the restricted version of the one-time password and the supplemental authentication value 124 corresponding to the one-time password generation routines 114 that generated the one-time password. In some embodiments, the restricted version of the particular one-time password is encrypted and preparing an unrestricted version of the particular one-time password includes decrypting the restricted version of the particular one-time password using the supplemental authentication value 124 corresponding to the one-time password generation routines 114 that generated the particular one-time password. In other embodiments, the restricted version of the particular one-time password is visually obscured by a display element (e.g., on a display of the first mobile device), and wherein preparing an unrestricted version of the particular one-time password includes removing the display element. Having prepared an unrestricted version of the particular one-time password, in various embodiments the unrestricted version of the particular one-time password is output by first mobile device 110 (e.g., via authentication paths 160, 162, 170, or 172).

In other embodiments, the supplemental authentication value 124 is used by its corresponding one-time password generation routine 114 to generate the one-time password. For example, if the supplemental authentication value 124 is "1234," the number 1234 may be integrated into the generated one-time password (or otherwise used to generate the one-time password). Referring again to the one-time password 00002880PASSWORD discussed above, in embodiments where the supplemental authentication value 124 is integrated into the one-time password, the generated one-time password might be 00002880P1A2S3S4WORD, for example. Having prepared the particular one-time password, the particular one-time password is output by first mobile device 110 (e.g., via authentication paths 160, 162, 170, or 172).

Display module 210 includes one or more screens coupled to first mobile device 110 and hardware (e.g., electronic components, wiring, etc.) and software (e.g., drivers) configured to cause information from first mobile device 110 to be displayed on the screen. In various embodiments, display module 210 includes a screen integrated into first mobile device 110 (e.g., the screen of a smartphone, the screen of a wearable mobile device). In various embodiments, display module 210 includes screens that are connected to first mobile device 110 via wired (e.g., a second monitor coupled to a laptop computer) or wireless (e.g., streamed to a display via a Wi-Fi connection) connections. Further, as part of authentication pathway 162, display module 210 may case the generated one-time password to be displayed on one or more screens coupled to first mobile device 110 as discussed herein.

In various embodiments, display module 210 includes a user interface 212 configured to receive information from user 150 and present information to user 150 (e.g., via a graphical user interface displayed on a touchscreen). In some of such embodiments, user interface 212 is configured to display indications of one of more one-time password generation routines 114 stored on first mobile device 110 and receive a selection by user 150 of a particular one-time password generation routine 114. Such displayed indications may indicate to which authentication system 130 the one-time password generation routine 114 correspond (e.g., first one-time password generation routine 114 associated with a bank, a second one-time password generation routine 114 associated with a social network), the username associated with the one-time password generation routine 114, or other information. In various embodiments, user interface 212 receives a user's selection of a particular one-time password generation routine 114. Having received the selection, first mobile device 110 may request the corresponding supplemental authentication value 124 as discussed herein. In some embodiments, user interface 212 is also configured to receive supplemental authentication value 124 directly from the user 150 (e.g., by user 150 typing in a PIN, by speaking a password, etc.) in addition first mobile device 110 being configured to receive supplemental authentication values 124 from second mobile device 120 as discussed herein.

In various embodiments, first mobile device 110 uses communications module 220 to communicate with other computing devices such as second mobile device 120 and/or the various authentication systems 130. In various embodiments, communications module 220 is used in connection to authentication pathway 160, receiving indication 140 from second mobile device 120, and/or sending any messages 142 to second mobile device 120 as discussed herein. In various embodiments, communications module 220 is configured to communicate using wired connections (e.g., Ethernet, USB, etc.), wireless connections (e.g., Bluetooth, Wi-Fi), or both. Accordingly, in various embodiments, prior to using a particular one-time password generation routine 114 to generate a one-time password, first mobile device 110 requests the corresponding supplemental authentication value 124 in a message 142 sent via communications module 220 to second mobile device 120. Further, in various embodiments, after generating a one-time password, first mobile device 110 send the one-time password in a message 142 sent via communications module 220 to second mobile device 120 for display on second mobile device 120 (i.e., as part of authentication pathway 172).

Control module 230 coordinates the various components of first mobile device 110 to execute the first application 112 and perform the various tasks discussed herein. Control module 230, for example, causes the one-time password generated by first application 112 to be output using display module 210 when authentication pathway 162 is utilized. Similarly, control module 230, causes the one-time password generated by first application 112 to be output using communications module 220 and sent to second mobile device 120 when authentication pathway 170 or 172 is utilized.

Security module 240 is configured to secure aspects of the operation of first mobile device 110. In some embodiments, security module 240 secures communication with various authentication systems 130 and/or second mobile device 120 by encrypting outgoing communication and decrypting received communication. In various embodiments, security module 240 is configured to delete one of more of the one-time password generation routines 114 when an insecure condition is determined. In some of such embodiments, first mobile device 110 attempts to communicate with second mobile device 120 regularly (e.g., every hour, every day, every week, etc.). Based on one or more failures to communicate with the second mobile device 120, security module 240 is configured to delete one of more of the plurality of one-time password generation routines 114. For example, if first mobile device 110 has not been able to communicate with second mobile device 120 for a month, the security module 240 may determine an insecure condition and delete the various one-time password generation routines 114 as a precaution. Similarly, in embodiments where security module 240 is configured to determine the geographic location of first mobile device 110, an insecure condition may be determined if, for example, the first mobile device 110 has left a certain area (e.g., a secure location), been taken to a certain area, etc.

Accordingly, the first mobile device 110 is configured to generate one-time passwords using a first application 112. In various embodiments, a corresponding supplemental authentication value 124 is necessary to generate a corresponding one-time password. In other embodiments, first mobile device 110 is able to generate the one-time password without the corresponding supplemental authentication value 124, but the one-time password is inaccessible without the corresponding supplemental authentication value 124. In either case, after first mobile device 110 receives the supplemental authentication value 124, the communication by user 150 may be authenticated using an authentication pathway 160, 162, 170, and/or 172.

Referring now to FIG. 3, an expanded block diagram of the second mobile device 120 of FIG. 1 is depicted in accordance with various embodiments. In various embodiments, second mobile device 120 includes second application 122, a display module 310, a communications module 320, a control module 330, and a security module 340. Second mobile device 120 may be any of a number of computing devices including but not limited to a desktop computer, laptop computer, tablet computer, smartphone, wearable mobile device (e.g., smartwatch, glasses). In various embodiments, second mobile device 120 is a wearable mobile device (e.g., smartwatch, glasses). Various embodiments of second mobile device 120 may exclude certain components such as security module 350 or have additional components (e.g., multiple communications modules 340).

Second application is an application running on second mobile device 120. Second application 122 is executable to cause second mobile device 120 to perform various tasks associated with FIGS. 5 and 6 discussed herein, as well as other tasks. In various embodiments, second application 122 includes a plurality of supplemental authentication values 124 (e.g., first supplemental authentication values 124A, nth supplemental authentication values 124n) in a supplemental authentication value library 126. In various embodiments, second application 122 is an application that has been downloaded from a server coupled to a digital distribution platform (e.g., the Apple® App Store, Google® Play, Microsoft® Store) that stores installation files for second application 122. Second application 122 is executable to communicate with first application 112 as discussed herein. While only a single second application 122 is shown in FIGS. 1 and 3, in other embodiments second mobile device 120 includes a set of one or more first applications 122, each of which including one or more supplemental authentication values 124 stored in one or more supplemental authentication value libraries 126. For example, in various embodiments, one second application 122 includes a plurality of supplemental authentication values 124 associated with authentication systems 130 coupled protecting electronic resources relating to financial websites (e.g., websites of banks) and another second application 122 includes a plurality of supplemental authentication values 124 associated with authentication systems 130 coupled protecting electronic resources relating to social network websites (e.g., Facebook®).

The various supplemental authentication values 124 may be any of a number of strings of characters. As discussed herein, in various embodiments supplemental authentication values 124 are PINs or passwords. Such PINs or passwords may be set by user 150 and/or generated by second mobile device 120 or authentication system 130. Supplemental authentication values 124 may be a decryption key usable to decrypt encrypted one-time password as discussed herein. In various embodiments, the one-time password generation routines 114 may incorporate the supplemental authentication values 124 into the generation of the one-time password.

Supplemental authentication value library 126 is configured to store a plurality of supplemental authentication values 124. In various embodiments, library 126 is also configured to store additional information such as indications showing to which respective one-time password generation routines 114 each of the supplemental authentication values 124 corresponds. Additionally, in some embodiments, library 126 stores account information 300 (e.g., username, pointer to particular authentication system 130 associated with username) corresponding to each supplemental authentication value 124 (e.g., first account information 300A corresponding to supplemental authentication value 124A, nth account information 300n corresponding to supplemental authentication value 124n). In various embodiments, the contents of supplemental authentication value library 126 may be indexed. For example, in various embodiments, supplemental authentication value library 126 is indexed such that a particular supplemental authentication value 124 corresponding to a particular authentication system 130 can be accessed using a set of lookup values assigned to the various authentication systems 130.

Display module 310 includes one or more screens coupled to second mobile device 120 and hardware (e.g., electronic components, wiring, etc.) and software (e.g., drivers) configured to cause information from second mobile device 120 to be displayed on the screen. In various embodiments, display module 310 includes a screen integrated into second mobile device 120 (e.g., the screen of a smartphone, the screen of a wearable mobile device). In various embodiments, display module 310 includes screens that are connected to second mobile device 120 via wired (e.g., a second monitor coupled to a laptop computer) or wireless (e.g., streamed to a display via a Wi-Fi connection) connections. Further, as part of authentication pathway 172, display module 310 may case the generated one-time password to be displayed on one or more screens coupled to second mobile device 110 as discussed herein.

In various embodiments, display module 310 includes a user interface 312 configured to receive information from user 150 and present information to user 150 (e.g., via a graphical user interface displayed on a touchscreen). In some of such embodiments, user interface 312 is configured to display indications of account information 300 (e.g., display one or more indications of a plurality of user accounts associated with user 150 that correspond to supplemental authentication values 124 stored on second device 120), and receive a selection by user 150 of a particular user account on the user interface 312. In various embodiments, this selection of a particular user account triggers the corresponding supplemental authentication value 124 being sent to first mobile device 110 and the subsequent outputting of the generated one-time password as discussed herein.

In various embodiments, second mobile device 120 uses communications module 320 to communicate with other computing devices such as first mobile device 110 and/or the various authentication systems 130. In various embodiments, communications module 320 is used in connection to authentication pathway 170, sending indication 140 to first mobile device 110, and/or receiving any messages 142 from first mobile device 110 as discussed herein. In various embodiments, communications module 320 is configured to communicate using wired connections (e.g., Ethernet, USB, etc.), wireless connections (e.g., Bluetooth, Wi-Fi), or both. Accordingly, in various embodiments, second mobile device 120 sends indication 140 to first mobile device 110 such that the generated one-time password may be output by first mobile device 110 and used to authentication user communication with authentication system 130. In various embodiments, first mobile device 110 requests, via message 142, that a particular supplemental authentication value 124 be sent to first mobile device 110. Further, in some embodiments, indication 140 includes an indication of a particular supplemental authentication value 124 as well as particular account information 300 associated with the particular supplemental authentication value 124. Further, in various embodiments, after first mobile device 110 generates a one-time password, second mobile device 120 receives the one-time password in a message 142 received via communications module 320 for display second mobile device 120 (i.e., as part of authentication pathway 172) or for subsequent transmission (e.g., by communications module 320) to authentication system 130 (i.e., as part of authentication pathway 170).

Control module 330 coordinates the various components of second mobile device 120 to execute the second application 122 and perform the various tasks discussed herein. Control module 330, for example, causes the one-time password generated by first application 112 to be output using communications module 320 when authentication pathway 170 is utilized and/or display module 310 when authentication pathway 172 is utilized. In various embodiments, security module 240 is configured to delete one of more of the supplemental authentication routines when an insecure condition is determined. In some of such embodiments, second mobile device 120 attempts to communicate with first mobile device 110 regularly (e.g., every hour, every day, every week, etc.). Based on one or more failures to communicate with the first mobile device 110, security module 340 is configured to delete one of more of the plurality supplemental authentication values 124. For example, if second mobile device 120 has not been able to communicate with first mobile device 110 for a month, the security module 340 may determine an insecure condition and delete the various supplemental authentication values 124 as a precaution. Similarly, in embodiments where security module 240 is configured to determine the geographic location of second mobile device 120, an insecure condition may be determined if, for example, the second mobile device 120 has left a certain area (e.g., a secure location), been taken to a certain area, etc.

Accordingly, second mobile device 120 is configured to store a plurality of supplemental authentication values 124 and send them to first mobile device 110 as part of an authentication process to verify user communication. Second mobile device 120 may be used to initiate the process in response to a user selection of a particular one-time password generation routine 114 (or selection of a particular user account associated with the particular one-time password generation routine 114). In various embodiments, second mobile device 120 receives the generated one-time password and displays it for the user 150 and/or sends the one-time password to the appropriate authentication system 130. But because the second mobile device 120 does not include the one-time password generation routines 114 themselves, the second mobile device 120 does not include all of the information necessary to authenticate user communication by itself, increasing the security of computer system 110.

Figure 4:
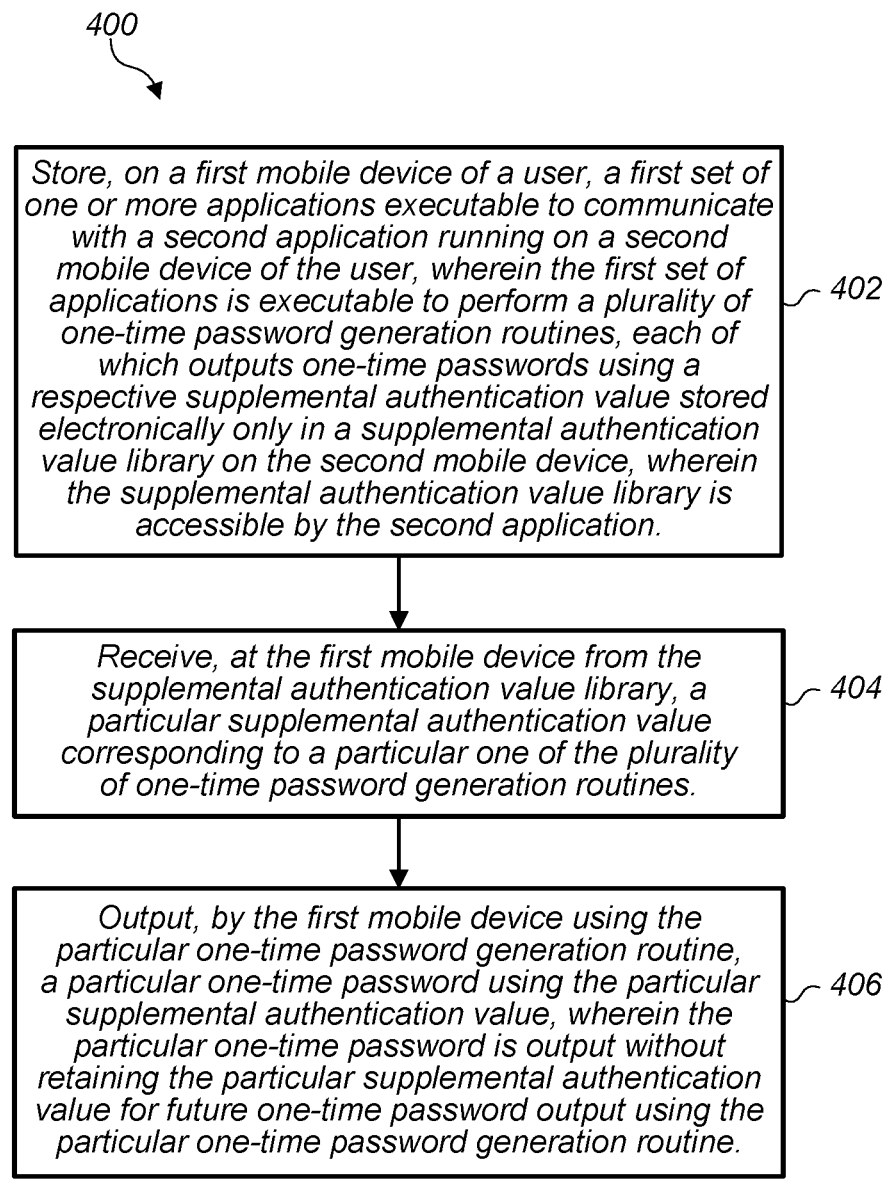
FIG. 4 is a flowchart illustrating an embodiment of a first portion of a two-mobile device authentication method in accordance with the disclosed embodiments.
Figure 5:
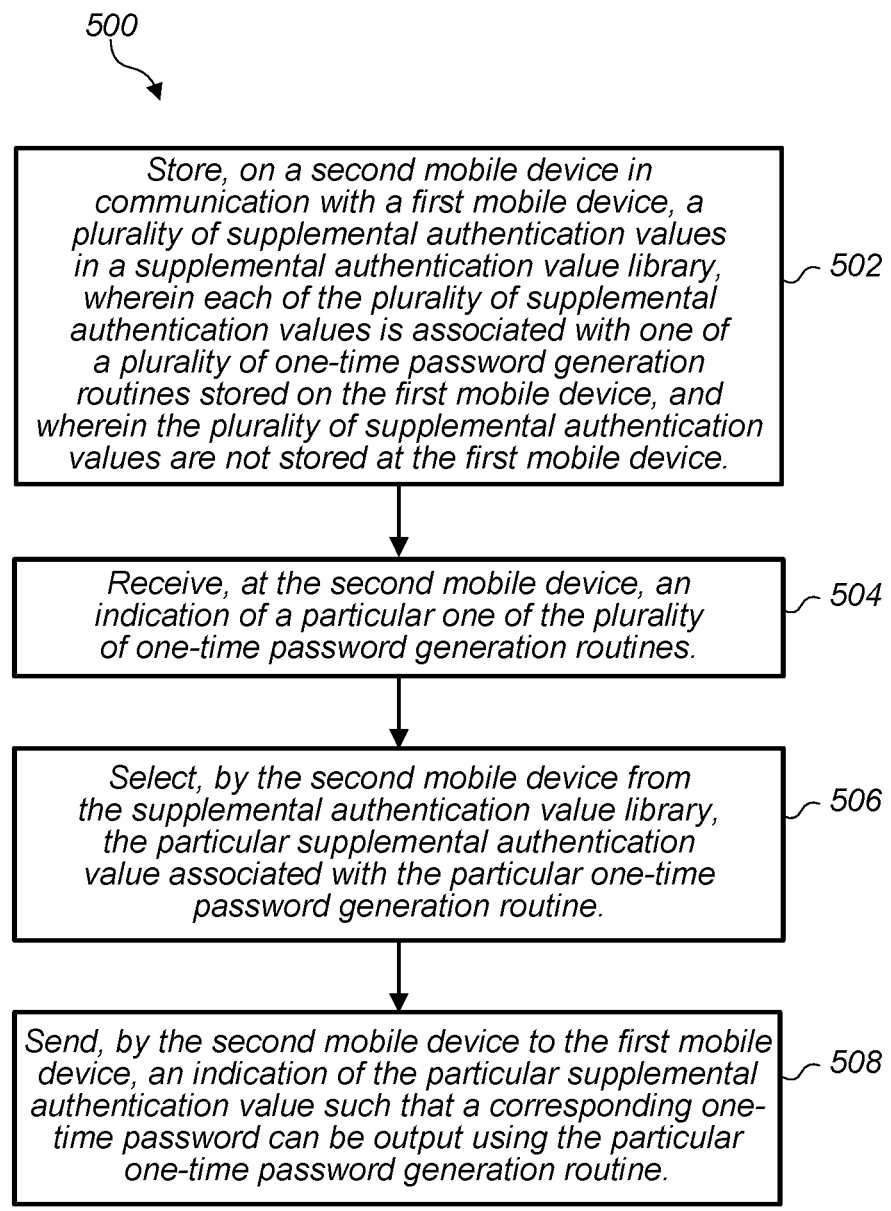
FIG. 5 is flowchart illustrating an embodiment of a second portion of a two-mobile device authentication method in accordance with the disclosed embodiments.
Figure 6:
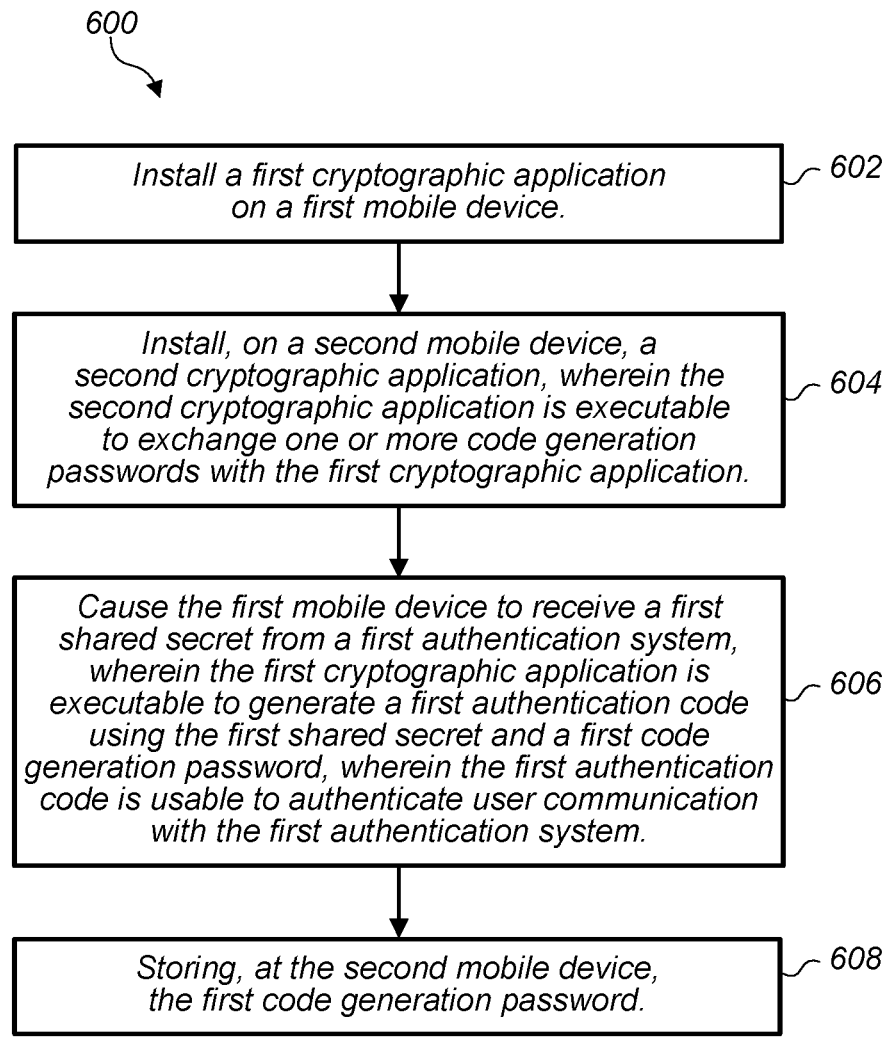
FIG. 6 is flowchart illustrating an embodiment of a two-mobile device authentication setup method in accordance with the disclosed embodiments.

FIGS. 4, 5, and 6 illustrate various flowcharts representing various disclosed methods implemented with computer system 100. Referring now to FIG. 4, a flowchart illustrating an embodiment of a first portion of a two-mobile device authentication method 400 is shown. In various embodiments, the various actions associated with method 400 are performed with first mobile device 110 and second mobile device 120. At block 402, a first mobile device 110 stores a first set of one or more applications 112 executable to communicate with a second application 122 running on a second mobile device 120 of the user 150. The first set of applications 112 is executable to perform a plurality of one-time password generation routines 114, each of which outputs one-time passwords using a respective supplemental authentication value 124 stored electronically only in a supplemental authentication value library 126 on the second mobile device 120. The supplemental authentication value library 126 is accessible by the second application 122. At block 404, the first mobile device 110 receives, from the supplemental authentication value library 126, a particular supplemental authentication value 124 corresponding to a particular one of the plurality of one-time password generation routines 114 stored on first mobile device 110. At block 406, first mobile device 110 outputs, using the particular one-time password generation routine 114, a particular one-time password using the particular supplemental authentication value 124. The particular one-time password is output without the first mobile device 110 retaining the particular supplemental authentication value 124 for future one-time password output using the particular one-time password generation routine 114.

Referring now to FIG. 5, a flowchart illustrating a second portion of a two-mobile device authentication method 500 is shown. In various embodiments, the various actions associated with method 500 are performed with second mobile device 120 and first mobile device 110. At block 502, a second mobile device 120, that is in communication with a first mobile device 110, stores a plurality of supplemental authentication values 124 in a supplemental authentication value library 126. In various embodiments, each of the plurality of supplemental authentication values 124 is associated with one of a plurality of one-time password generation routines 114 stored on the first mobile device 110. Further, the plurality of supplemental authentication values 124 are not stored at the first mobile device 110. At block 504, second mobile device 120 receives an indication of a particular one of the plurality of one-time password generation routines 114. At block 506, second mobile device 120 selects, from the supplemental authentication value library 126, the particular supplemental authentication value 124 associated with the particular one-time password generation routine 114. At block 508, second mobile device 120 sends to the first mobile device 110, an indication of the particular supplemental authentication value 124 such that a corresponding one-time password can be output using the particular one-time password generation routine 114.

For example, a user 150 desiring to use two-step authentication to authenticate user communication with an authentication system 130 uses his smartphone and smartwatch such that the smartphone functions as first mobile device 110 and the smartwatch functions as second mobile device 120 as discussed herein. Using his laptop, user 150 attempts to access an electronic resource (e.g., data files stored in the cloud storage service). He enters his username and password on his storage service's website. The computer system providing access to his storage service accounted is coupled to authentication system 130, which will only grant access to the user 150 if his identity is authenticated (in addition to his providing his username and password). Accordingly, user 150 is prompted for a one-time password. User 150 then accesses his smartwatch and selects an icon corresponding to the electronic resource (e.g., the logo of his storage service) on the smartwatch's user interface. The smartwatch in turn, determines which supplemental authentication value 124 corresponds to the user's selection (e.g., which supplemental authentication value 124 corresponds to the selected icon) and sends the determined supplemental authentication value 124 to the smartphone. The smartphone receives the supplemental authentication value 124 and outputs a one-time password generated using the one-time password generation routine 114 corresponding to the received supplemental authentication value 124. The smartphone sends the one-time password to the smartwatch and does not retain the supplemental authentication value 124. The one-time password is displayed on the user interface 312 of the smartwatch. Alternatively, the one-time password is displayed on the user interface 212 of the smartphone. User 150 looks at the smartwatch or smartphone, reads the one-time password, and inputs the one-time password to authentication system 130 by typing it in on his laptop.

Alternatively, in various embodiments, the two-step authentication method discussed herein may be employed without the user 150 having to directly access either his first mobile device 110 or second mobile device 120. For example, a user 150 desiring to use two-step authentication to authenticate user communication with an authentication system 130 uses his smartphone and smartwatch as discussed herein. Using his laptop, user 150 attempts to access an electronic resource (e.g., data files stored in his cloud storage service). He enters his username and password on his storage service's website. The computer system providing access to his storage service accounted is coupled to authentication system 130, which will only grant access to the user 150 if his identity is authenticated (in addition to his providing his username and password). Authentication system 130 issue a command that is received by user's smartwatch and/or smartphone that triggers the second step of the two-step authentication method. Based on the command from authentication system 130, the supplemental authentication value 124 on the smartwatch is identified and sent to the smartphone. The smartphone receives the supplemental authentication value 124 and uses it and a corresponding one-time password generation routine 114 to output a one-time password to be sent to authentication system 130 to authenticate user's identity. In some embodiments, the smartphone sends the one-time password to authentication system 130 via a network (e.g., the Internet). In other embodiments, the smartwatch sends the one-time password to the authentication system via a wide-area network (e.g., the Internet).

Referring now to FIG. 6, a flowchart illustrating an embodiment of a two-mobile device authentication setup method 600 is shown. In various embodiments, the various actions associated with method 600 are performed with first mobile device 110, second mobile device 120, and authentication system 130. At block 602, first application 112 is installed on first mobile device 110. At block 604, second application 122 is installed on second mobile device 120. As discussed herein, second application 122 is executable to exchange one or more supplemental authentication values 124 with first application 112. At block 606, an entity (e.g., a user 150 and/or software process setting up first application 112 and/or second application 122) causes first mobile device 110 to receive a first shared secret (e.g., used as part of a first one-time password generation routine 114) from a first authentication system 130. As discussed herein, first application 112 is executable to generate a one-time password using the first shared secret and a first supplemental authentication value 124. As discussed herein, the first one-time password is usable to authenticate user communication with the first authentication system 130. At block 608, an entity (e.g., a user 150 and/or software process setting up first application 112 and/or second application 122), stores the first supplemental authentication value 124 at second mobile device 120.

For example, a user 150 desiring to set up two-step authentication using her smartphone (e.g., first mobile device 110) and smartwatch (e.g., second mobile device 120) installs first application 112 on her smartphone and second application 122 on her smartwatch. She accesses installation files for the first application 112 and second application 112 from a digital distribution platform (e.g., the Apple® App Store, Google® Play, Microsoft® Store). After installing the first application 112 and second application 112, user 150 communicates with authentication system 130. In particular, she logs into her bank account (which is coupled to authentication system 130) and elects to set up two-step authentication using her smartphone and smartwatch. In response to commands by user 150, authentication system 130 sends a shared secret (and in embodiments, the one-time password generation routine 114 that uses the shared secret to generate one-time passwords) to her smartphone, which stores the shared secret in memory. The user 150 then sets a PIN to be a supplemental authentication value 124 to be used with the shared secret to generate one-times passwords and inputs the PIN to her smartwatch (e.g., via a touchscreen interface). Alternatively, during the installation of second application 122, the program installing second application 122 may generate a PIN automatically. Her smartwatch stores the PIN in memory.

Exemplary Computer System

Figure 7:
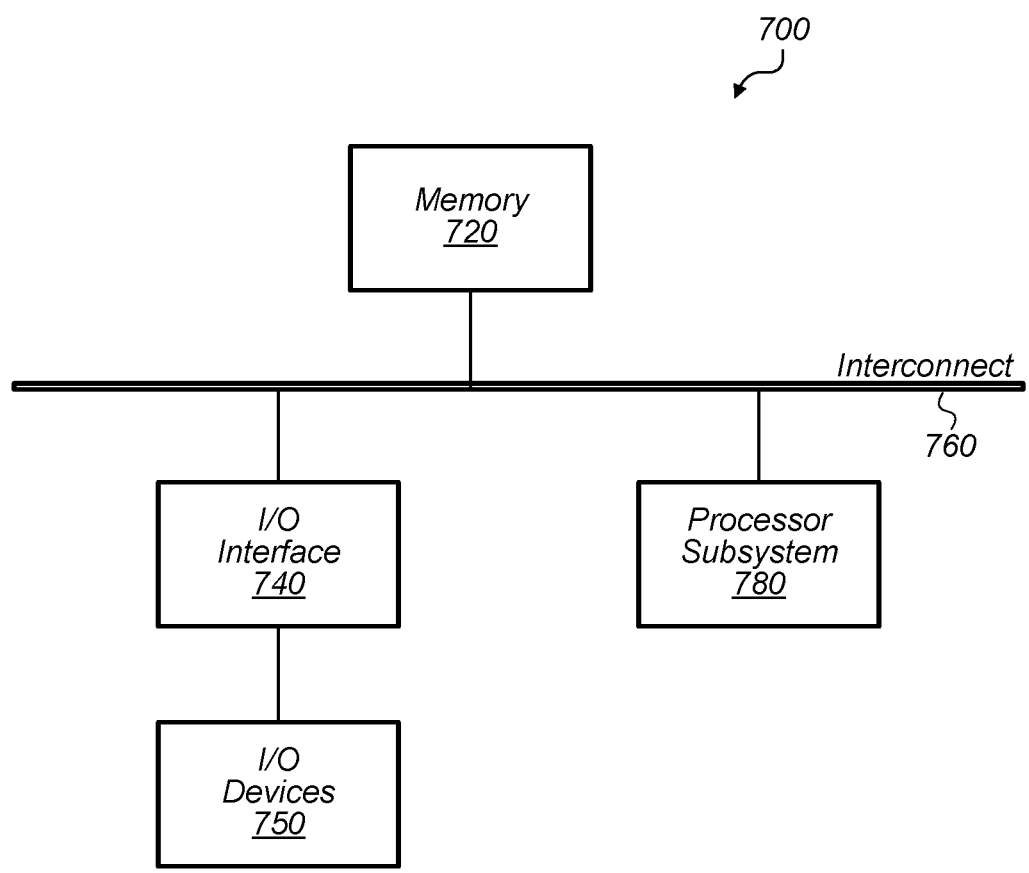
FIG. 7 is a block diagram of an exemplary computer system, which may implement the various components of FIGS. 1, 2, and 3.

Turning now to FIG. 7, a block diagram of an exemplary computer system 700, which may implement the various components of computer system 100 (e.g., first mobile device 110, second mobile device 120, authentication systems 130) is depicted. Computer system 700 includes a processor subsystem 760 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 760 may include one or more processors or processing units. In various embodiments of computer system 700, multiple instances of processor subsystem 760 may be coupled to interconnect 760. In various embodiments, processor subsystem 760 (or each processor unit within 760) may contain a cache or other form of on-board memory.

System memory 720 is usable to store program instructions executable by processor subsystem 760 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 760 and secondary storage on I/O Devices 750 (e.g., a hard drive, storage array, etc.). In some embodiments, these other forms of storage may also store program instructions executable by processor subsystem 760.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
 storing, on a first mobile device of a user, a first set of one or more applications executable to communicate with a second application running on a second mobile device of the user, wherein the first set of applications is executable to perform a plurality of one-time password generation routines, each of which outputs one-time passwords using a respective supplemental authentication value stored electronically only in a supplemental authentication value library on the second mobile device, wherein the supplemental authentication value library is accessible by the second application;

receiving, at the first mobile device from the supplemental authentication value library, a particular supplemental authentication value corresponding to a particular one of the plurality of one-time password generation routines; and outputting, by the first mobile device using the particular one-time password generation routine, a particular one-time password using the particular supplemental authentication value, wherein the particular one-time password is output without retaining the particular supplemental authentication value for future one-time password output using the particular one-time password generation routine.

2. The method of claim 1, wherein the first set of applications includes a plurality of shared secrets, wherein each of the shared secrets is associated with a particular supplemental authentication value in the supplemental authentication value library.

3. The method of claim 1, wherein the outputting includes:
computing a restricted version of the particular one-time password using the particular one-time password generation routine, wherein the restricted version of the particular one-time password is inaccessible to a user of the first mobile device; and
using the restricted version of the particular one-time password and the particular supplemental authentication value, preparing an unrestricted version of the particular one-time password for outputting by the first mobile device.

4. The method of claim 3, wherein the restricted version of the particular one-time password is encrypted, and wherein preparing an unrestricted version of the particular one-time password includes decrypting the restricted version of the particular one-time password.

5. The method of claim 3, wherein the restricted version of the particular one-time password is visually obscured by a display element, and wherein preparing an unrestricted version of the particular one-time password includes removing the display element.

6. The method of claim 1, wherein the outputting includes:
generating the particular one-time password using the particular one-time password generation routine and the particular supplemental authentication value.

7. The method of claim 1, further comprising:
prior to the receiving, requesting, by the first mobile device, the particular supplemental authentication value corresponding to the particular one of the plurality of one-time password generation routines.

8. The method of claim 1, further comprising:
attempting to communicate with the second mobile device regularly; and
based on one or more failures to communicate with the second mobile device, deleting one of more of the plurality of one-time password generation routines.

9. The method of claim 1, wherein the outputting includes causing the particular one-time password to be displayed on a display of the second mobile device.

10. A method comprising:
storing, on a second mobile device in communication with a first mobile device, a plurality of supplemental authentication values in a supplemental authentication value library, wherein each of the plurality of supplemental authentication values is associated with one of a plurality of one-time password generation routines stored on the first mobile device, and wherein the plurality of supplemental authentication values are not stored at the first mobile device;
receiving, at the second mobile device, an indication of a particular one of the plurality of one-time password generation routines;
selecting, by the second mobile device from the supplemental authentication value library, the particular supplemental authentication value associated with the particular one-time password generation routine; and
sending, by the second mobile device to the first mobile device, an indication of the particular supplemental authentication value such that a corresponding one-time password is generated using the particular one-time password generation routine.

11. The method of claim 10 further comprising:
receiving, from the first mobile device, the corresponding one-time password.

12. The method of claim 11 further comprising:
displaying, on a screen of the second mobile device, the corresponding one-time password.

13. The method of claim 11 further comprising:
sending the corresponding one-time password from the second mobile device to a first authentication system.

14. The method of claim 10 further comprising:
attempting to communicate with the first mobile device regularly; and
based on one or more failures to communicate with the first mobile device, deleting one or more supplemental authentication values stored on the second mobile device.

15. The method of claim 10, wherein the supplemental authentication value library stores information indicative of a plurality of user accounts, wherein each supplemental authentication value is associated with one of the plurality of user accounts, the method further comprising:
sending, by the second mobile device to the first mobile device, an indication of a particular user account associated with the particular supplemental authentication value.

16. The method of claim 10, wherein the supplemental authentication value library stores information indicative of a plurality of user accounts, wherein each supplemental authentication value is associated with one of the plurality of user accounts, the method further comprising:
displaying, on a user interface of the second mobile device, one or more indications of the plurality of user accounts;
wherein receiving the indication of the one of the plurality of one-time password generation routines includes receiving a selection of the particular user account on the user interface.

17. The method of claim 10, wherein the first mobile device is a smartphone and the second mobile device is a wearable mobile device.

18. A non-transitory, computer-readable medium storing executable instructions comprising:
a first set of instructions that, when executed by a first mobile device of a user, cause the first mobile device to perform operations comprising:
storing, on the first mobile device, a first set of one or more applications executable to communicate with a second application running on a second mobile device of the user, wherein the first set of applications is executable to perform a plurality of one-time password generation routines, each of which outputs one-time passwords using a respective supplemental authentication value stored electronically only in a supplemental authentication value library on the second mobile device, wherein the supplemental authentication value library is accessible by the second application;

receiving, at the first mobile device from the supplemental authentication value library, a particular supplemental authentication value corresponding to a particular one of the plurality of one-time password generation routines; and outputting, by the first mobile device using the particular one-time password generation routine, a particular one-time password using the particular supplemental authentication value, wherein the particular one-time password is output without retaining the particular supplemental authentication value for future one-time password output using the particular one-time password generation routine.

19. The non-transitory, computer-readable medium of claim 18, wherein the operations further comprise:

a second set of instructions that, when executed by the second mobile device of the user, cause the second mobile device to perform operations comprising:

storing, on a second mobile device in communication with a first mobile device, a plurality of supplemental authentication values in a supplemental authentication value library, wherein each of the plurality of supplemental authentication values is associated with one of a plurality of one-time password generation routines stored on the first mobile device, and wherein the plurality of supplemental authentication values are not stored at the first mobile device;

receiving, at the second mobile device, an indication of a particular one of the plurality of one-time password generation routines;

selecting, by the second mobile device from the supplemental authentication value library, the particular supplemental authentication value associated with the particular one-time password generation routine; and sending, by the second mobile device to the first mobile device, an indication of the particular supplemental authentication value such that a corresponding one-time password is generated using the particular one-time password generation routine.

20. The non-transitory, computer-readable medium of claim 18, wherein the computer-readable medium is disposed on a server coupled to a digital distribution platform.

* * * * *